(12) United States Patent
Dingley

(10) Patent No.: US 7,744,134 B2
(45) Date of Patent: Jun. 29, 2010

(54) CONNECTING INSULATED DUCT

(75) Inventor: Terence Raymond Dingley, Stanley (GB)

(73) Assignee: Doby Cleats Limited, County Durham (GB)

(*) Notice: Subject to any disclaimer, the term of this patent is extended or adjusted under 35 U.S.C. 154(b) by 0 days.

(21) Appl. No.: 11/319,090

(22) Filed: Dec. 27, 2005

(65) Prior Publication Data

US 2006/0186667 A1  Aug. 24, 2006

(51) Int. Cl.
*F16L 23/00* (2006.01)
(52) U.S. Cl. .................. 285/405; 285/48; 285/408; 285/424; 285/123.16
(58) Field of Classification Search ............... 285/407, 285/424, 123.15, 123.16, 124.5, 903, 405, 285/408, 48
See application file for complete search history.

(56) References Cited

U.S. PATENT DOCUMENTS

| | | | | |
|---|---|---|---|---|
| 2,183,174 A * | 12/1939 | Smith | ............................ | 138/39 |
| 2,916,054 A * | 12/1959 | Callan | ........................... | 285/55 |
| 4,123,094 A * | 10/1978 | Smitka | ......................... | 285/405 |
| 4,244,609 A * | 1/1981 | Smitka | ......................... | 285/405 |
| 4,410,206 A * | 10/1983 | Mez | ............................. | 285/405 |
| 4,537,430 A * | 8/1985 | Sullivan | ...................... | 285/364 |
| 4,558,892 A * | 12/1985 | Daw et al. | ................... | 285/331 |
| 4,566,724 A * | 1/1986 | Arnoldt et al. | .............. | 285/364 |
| 4,662,661 A * | 5/1987 | Arnoldt | ....................... | 285/363 |
| 5,005,879 A * | 4/1991 | Jackson | ....................... | 285/405 |
| 5,165,730 A * | 11/1992 | McElroy | ....................... | 285/39 |
| 5,352,000 A * | 10/1994 | Issagholian-Havai et al. | .... | 285/405 |
| 5,450,879 A * | 9/1995 | Toben | ......................... | 138/109 |
| 5,564,758 A * | 10/1996 | Tiberio | ........................ | 285/405 |
| 5,621,956 A * | 4/1997 | Kolesar | ...................... | 29/243.5 |
| 5,673,947 A * | 10/1997 | De Waal | ...................... | 285/364 |
| 5,840,392 A * | 11/1998 | Clark et al. | ................. | 428/40.1 |
| 5,857,713 A * | 1/1999 | Horimoto | ..................... | 285/81 |
| 6,213,522 B1 * | 4/2001 | Jacobson et al. | .............. | 285/64 |

* cited by examiner

*Primary Examiner*—James M Hewitt
*Assistant Examiner*—Jay R Ripley
(74) *Attorney, Agent, or Firm*—Jackson Walker, LLP

(57) ABSTRACT

A connector assembly is used in connecting one duct section to another, at least one of the duct sections being an insulated duct. The assembly comprises a plurality of first elements, and a plurality of second elements, each first element including attachment means for attachment of an end face of a duct section thereto, and, in use, at least one second element engages with two first elements.

16 Claims, 8 Drawing Sheets

CONNECTING INSULATED DUCT

FIELD OF THE INVENTION

The invention relates to connecting insulated ducts, and in particular to an apparatus and method for connecting ducts made from insulated materials, such as is used for the transport of heated and/or cooled air in heating systems and air conditioning systems.

BACKGROUND OF THE INVENTION

Ducting is commonly used in large buildings such as factories, office blocks and apartment blocks for the transmission of air, which may be for the purposes of heating or cooling an environment in a building, or ventilating a building. Typically, such ducts are used to transport heated or cooled air. Where climatic conditions are such that the difference between the temperature of the ambient temperature of the atmosphere to be heated or cooled is relatively close to the temperature of the heated or cooled, for example 3 or 4 degrees C., ducts have historically been formed from sheet steel, and have been un-insulated.

In locations where climatic conditions are more extreme, heat loss or gain by the heating/cooling air in the duct can pose a significant problem, which has resulted in ducts being insulated in those environments to maintain the desired temperature of the conveyed air and to conserve energy. First attempts at insulating ducts consisted of lagging ducts with a material having insulating properties. However, such work is labour intensive and time consuming. Furthermore, lagging ducts with traditional insulating materials detracts from the sectional nature of duct work, i.e. being sectional in nature duct work is relatively simple to assemble and disassemble. Lagging in insulating material makes disassembly more difficult.

One solution proposed involves making ducts from insulating boards. Ducts made from such insulating boards are used widely in countries having extreme climates, both hot and cold. Even in more temperate climates the desire to increase the efficiency of heating and air conditioning systems is leading to insulated ducting being specified more frequently by architects and civil engineers.

One problem associated with ducts made from insulated boards is that the method of connecting one section of duct to another is time consuming due to the parts being relatively complex, and fitters not using the connecting method regularly. This results in insulated ducts being more expensive to install.

In the known method of connecting ducts made from insulated boards the end of a duct section is provided with a bracket, a part of which extends beyond the outer edge of the duct section. When the ends of two duct sections are aligned a cleat is forced over two abutting brackets. If there is any misalignment between the duct sections, forcing the cleat onto the brackets can be extremely difficult.

The known method of connecting ducts made from insulated boards is very different from methods used to connect un-insulated ducts. There are circumstances involving a requirement to connect an un-insulated duct to an insulated duct, for example where cool air is being conveyed and the duct passes through an environment having an elevated temperature. Connecting insulated and uninsulated ducts together posses significant problems to the installer.

It would therefore be desirable to improve the connection of one section of duct to another.

SUMMARY OF THE INVENTION

According to one embodiment of the invention, there is provided a connector assembly configured to connect an insulated duct section having walls formed of insulated board to another duct section, the assembly comprising a plurality of first elements, and a plurality of second elements, wherein each first element includes attachment means for attachment of an end face of a duct section thereto, and wherein, in use, at least one second element engages with two first elements, wherein each first element comprises a flange, and each attachment means comprises an opening in the flange configured to receive a wall of the insulated duct section, wherein each second element constitutes a corner element, wherein each the first element and each the second element each include a sealing means, and wherein the sealing means of the first elements comprises a rib extending along a longitudinal axis of each first element and the sealing means of each second element comprises a complementary channel extending between the free ends thereof, wherein, in use, the rib of the first elements being received in the channel of the corner elements, and wherein the sealing means of the first and second elements each extend into and seal in a groove in an end face of the insulated duct section providing a substantially continuous seal between the first and second elements and the end face of the insulated duct section.

According to a second embodiment of the invention, there is provided an assembled duct comprising an insulated duct section having walls formed of insulated board and another duct section, wherein the insulated duct section is provided with a connector assembly connecting the insulated duct section to the other duct section, the assembly comprising a plurality of first elements, and a plurality of second elements, wherein each first element includes attachment means for attachment of an end face of a duct section thereto, and wherein at least one second element engages with two first elements, wherein each first element comprises a flange, and each attachment means comprises an opening in the flange, a wall of the insulated duct section being received in the opening, wherein each second element constitutes a corner element, wherein each the first element and each the second element each include a sealing means, and wherein the sealing means of each the first element comprises a rib extending along a longitudinal axis of the first element and the sealing means of each second element comprises a complementary channel extending between the free ends thereof, the rib of the first elements being received in the channel of the corner elements, and wherein the sealing means of the first and second elements each extend into and seal in a groove in an end face of the insulated board of the insulated duct section received in the opening, providing a substantially continuous seal between the first and second elements and the end face of the insulated duct section.

According to a third embodiment of the invention, there is provided a method of assembling insulated ducting comprising the steps of: i) attaching a connector assembly in accordance with one disclosed embodiment of the connector assembly to an insulated duct section; ii) aligning fixing means of the connector assembly to fixing means of another insulated duct section; iii) securing the duct sections together with fastener.

According a fourth embodiment of the invention, there is provided a method of assembling insulated and non-insulated ducting comprising the steps of: i) attaching a connector assembly in accordance with one disclosed embodiment of the connector assembly to an insulated duct section; ii) aligning fixing means of the connector assembly to fixing means of an un-insulated duct section; iii) securing the duct sections together with fastener.

BRIEF DESCRIPTION OF THE DRAWINGS

In the drawings, which illustrate preferred embodiments of a connecting assembly for use in connecting duct sections, and are for the purpose of example.

DETAILED DESCRIPTION OF THE PREFERRED EMBODIMENTS

Figure 1A:
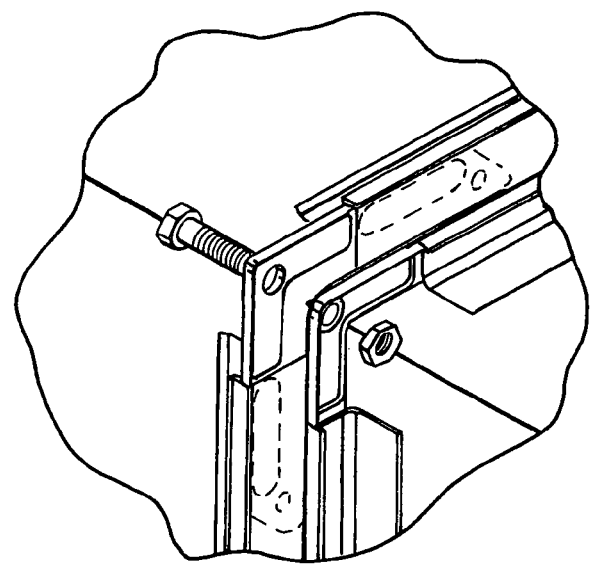
FIG. 1a is a detailed view of one part of the connecting apparatus circled in FIG. 1.
Figure 1:
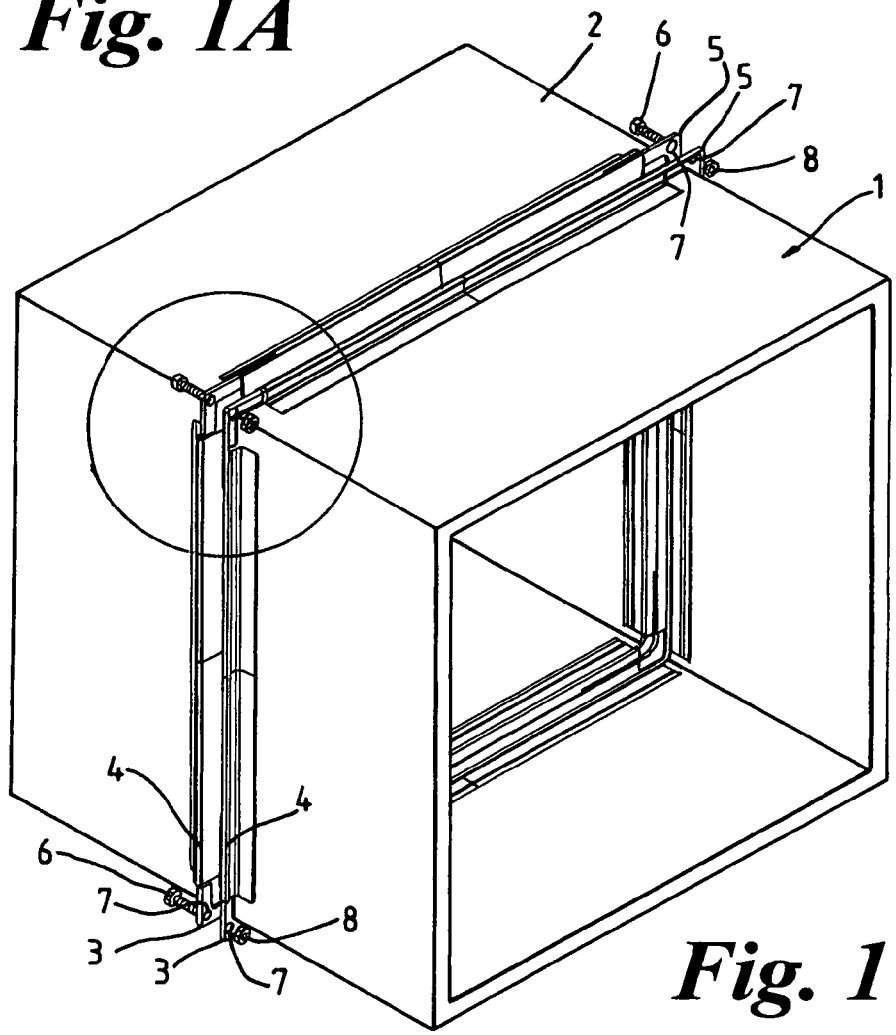
FIG. 1 is a schematic representation of two sections of duct equipped with connecting apparatus according to the invention.
Figure 2:
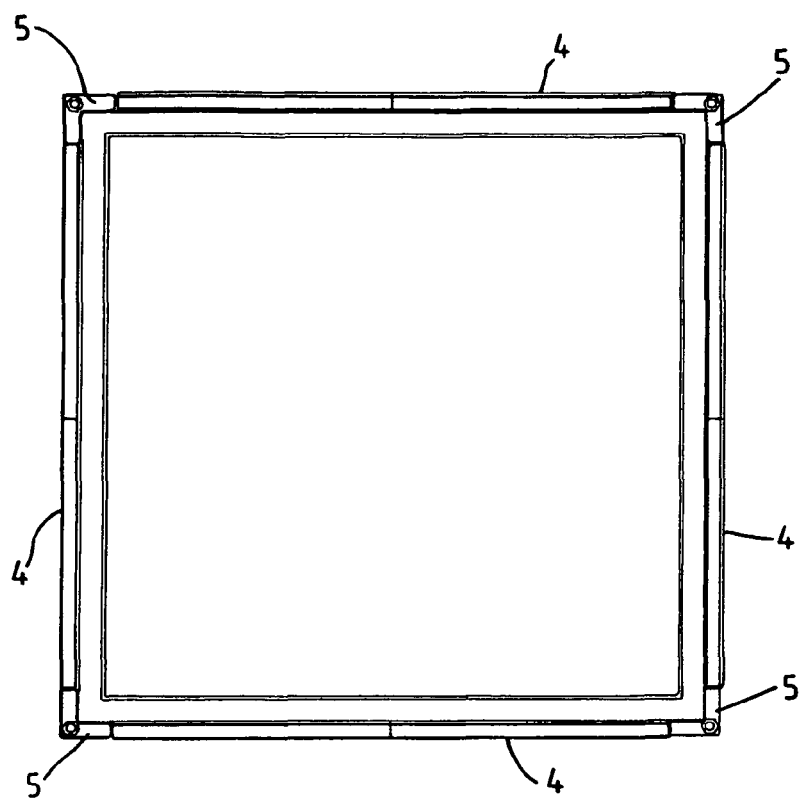
FIG. 2 is an end view of a duct equipped with connecting apparatus according to the invention.
Figure 3:
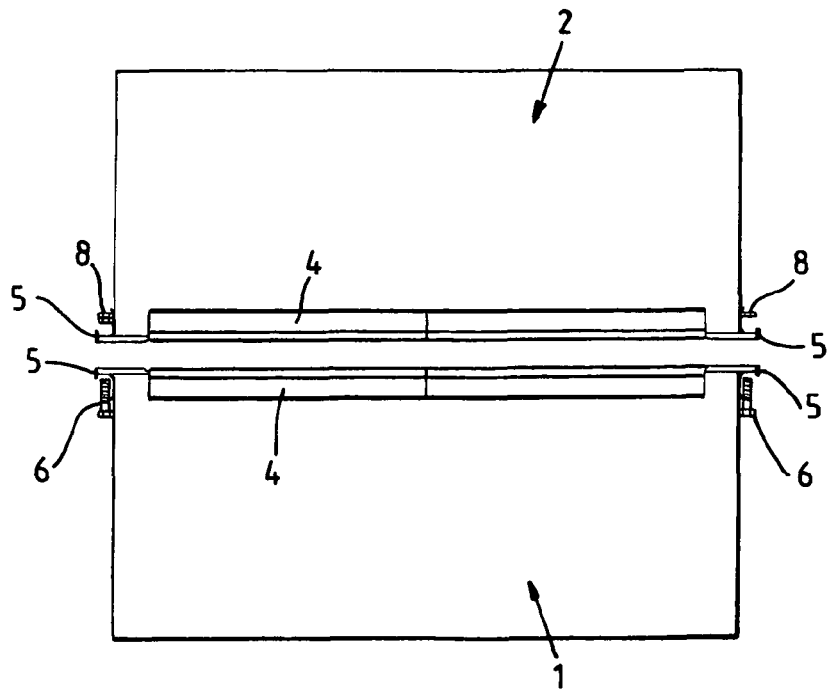
FIG. 3 is a plan view of two duct sections equipped with connecting apparatus according to the invention.

Referring now to FIGS. 1 to 3, two insulated board duct sections 1, 2 are each provided with connecting apparatus 3 comprising a flange 4 and a corner element in the form of a plate 5. As can be seen from FIG. 1, when one duct section 1, provided with connecting apparatus 3 is presented to a duct section 2 which is also provided with connecting apparatus 3, the two duct sections can be joined together by passing bolts 6 through apertures 7 in the corner elements 5 and then fastening nuts 8 onto the bolts.

Figure 4:
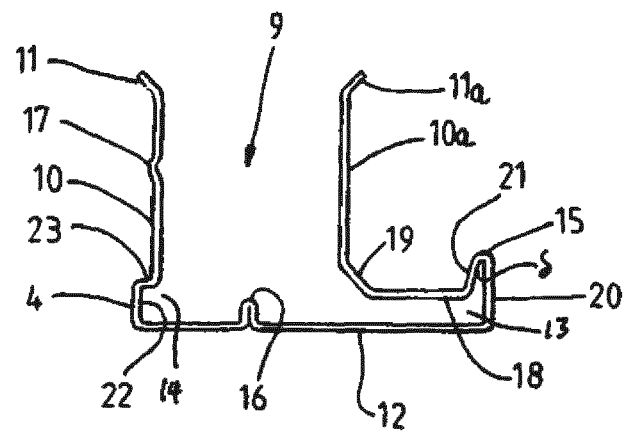
FIG. 4 is an end view of a flange forming part of the connecting apparatus.

FIGS. 4 to 11 illustrate the connecting apparatus 3 in more detail. FIG. 4 shows the profile of the flange 4, which in the illustrated example is rolled from galvanised steel. The profile provides a channel 9 having walls 10, 10a each of which terminate with lips 11, 11a projecting outwardly of the channel. The wall 10 includes a rib 17 which serves to increase the wall's resistance to bending and twisting. The base of the wall 10 terminates in a first channel 14 the purpose of which is described below. A base 12 extends from a bottom edge of the first channel 14 substantially perpendicular to the axis of the wall 10, and terminates in a second channel 13.

The wall 10a is substantially parallel to the wall 10. The base of the wall 10a terminates in a rib 19 projecting at about 45 degrees to the axis of the wall 10a. A wall element 18 substantially parallel to the base 12 extends from the other side of the rib 19 to a second channel 13. The channel 13 is formed by a wall extending substantially perpendicular to the base 12 which bends back on itself at 15 to generate a small gap δ between the insides of the walls 20 and 21.

The base 12 further includes a Dutch fold 16, which serves two purposes. First, it adds strength to the flange, and second it engages with the board from which the insulated duct 1 is formed, the advantage of which is described below with reference to FIG. 6.

Figure 5:
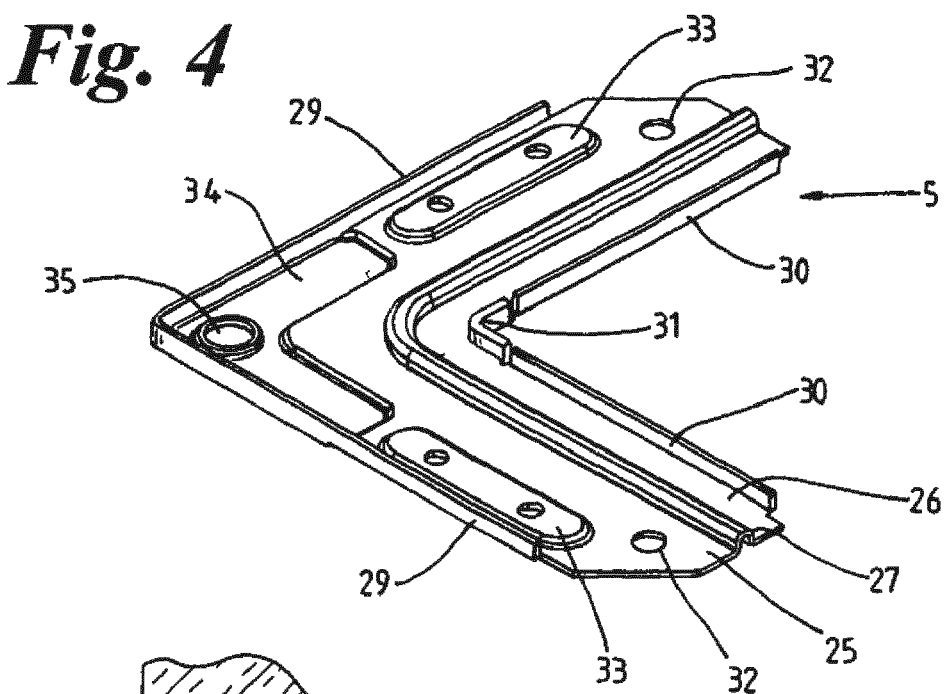
FIG. 5 is a schematic representation of a corner element forming part of the connecting apparatus.
Figures 7, 8:
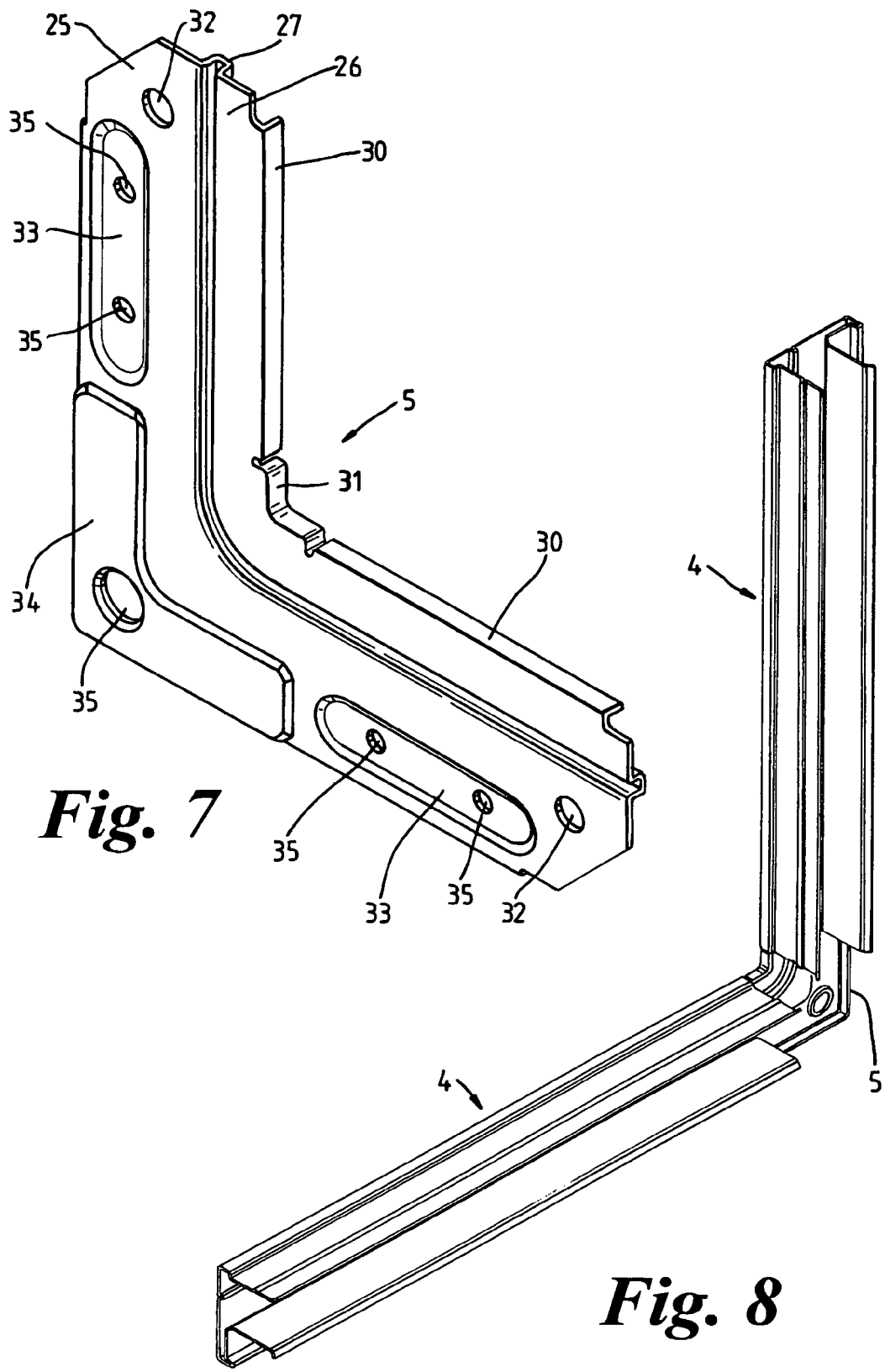
FIG. 7 is a schematic representation of a corner element forming part of the connecting apparatus.
FIG. 8 is a schematic representation of two flanges as illustrated in FIG. 4 attached to a corner element of the type illustrated in FIG. 5.

In FIGS. 5 and 7, the corner element is a right angled plate 5. In the example this plate 5 is formed from pressed steel and includes base portions 25 and 26 joined together by a channel 27. Edge portions 29 and 30 extend from the base portions 25, 26 respectively and are substantially perpendicular to the plane of the said base portions 25, 26. The base portion 25 includes two formations 33, and a formation 34 extending to both sides of the right angle in the plate 5. The purpose of these formations is to add strength to the plate. In the example the formations are formed by swaging. The formation 34 includes an aperture 35, which is used in the connection of one duct to another (see FIG. 1). The plate 5 further includes an edge element 31, which projects further from the plane of the base 25, 26 than the edge portions 30, and is wider than the edge portion 30. The slight difference in height of the edge element 31 and the edge portion 30 allows the element 31 to act as a stop when a flange 4 is pushed onto the right angled plate 5. Each end of the plate 5 includes an aperture 32, which is a tooling pilot hole. The formations 33 also include apertures 36. During assembly of the duct, the channel sections 1, flanges 4 are punched to form dimples that engage with the apertures 36. Engagement of these dimples with the apertures 36 assists in keeping the duct connector rigid, particularly during assembly.

Figure 6:
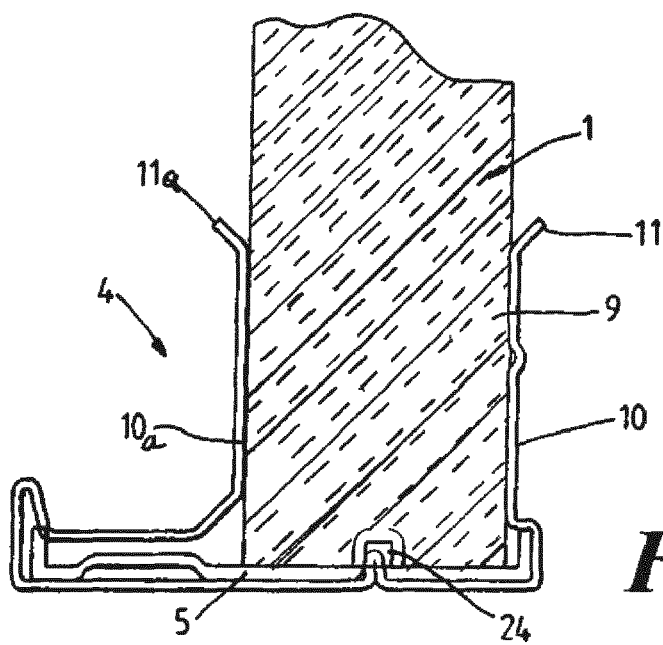
FIG. 6 is an end view of one wall of a section of insulated duct equipped with the flange and corner element illustrated in FIGS. 4 and 5.

Referring now to FIG. 6, the insulated duct 1 is inserted into the channel 9 of the flange 4. The wall width of the duct 1 is fractionally greater than the distance between the walls 10 and 10a of the flange. The lips 11, 11a provide an opening to the channel 9 that is wider than the wall width of the duct 1. As the edge of the wall is pushed between the lips 11, 11a the walls 10, 10a are pushed apart against the resilience of the galvanised steel so that when the insulated duct is in the position illustrated in FIG. 6, the walls 10 and 10a press against the opposing walls of the duct 1.

The Dutch fold 16 engages with a groove 24 in the end face of the duct 1 (except that at the corners, it is the channel 27 that sits in the groove 24). The groove 24 may be formed by the Dutch fold pressing into the end face of the duct. Alternatively, the groove 24 may be formed during the manufacture of the duct. The groove 24 engaged by the Dutch fold 16 assists in sealing the assembled duct.

Figure 9A:
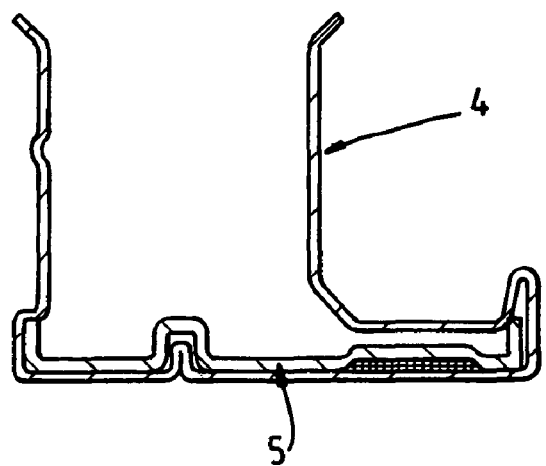
FIG. 9a is a sectional representation on line A-A of the assembly illustrate in FIG. 9.
Figure 9:
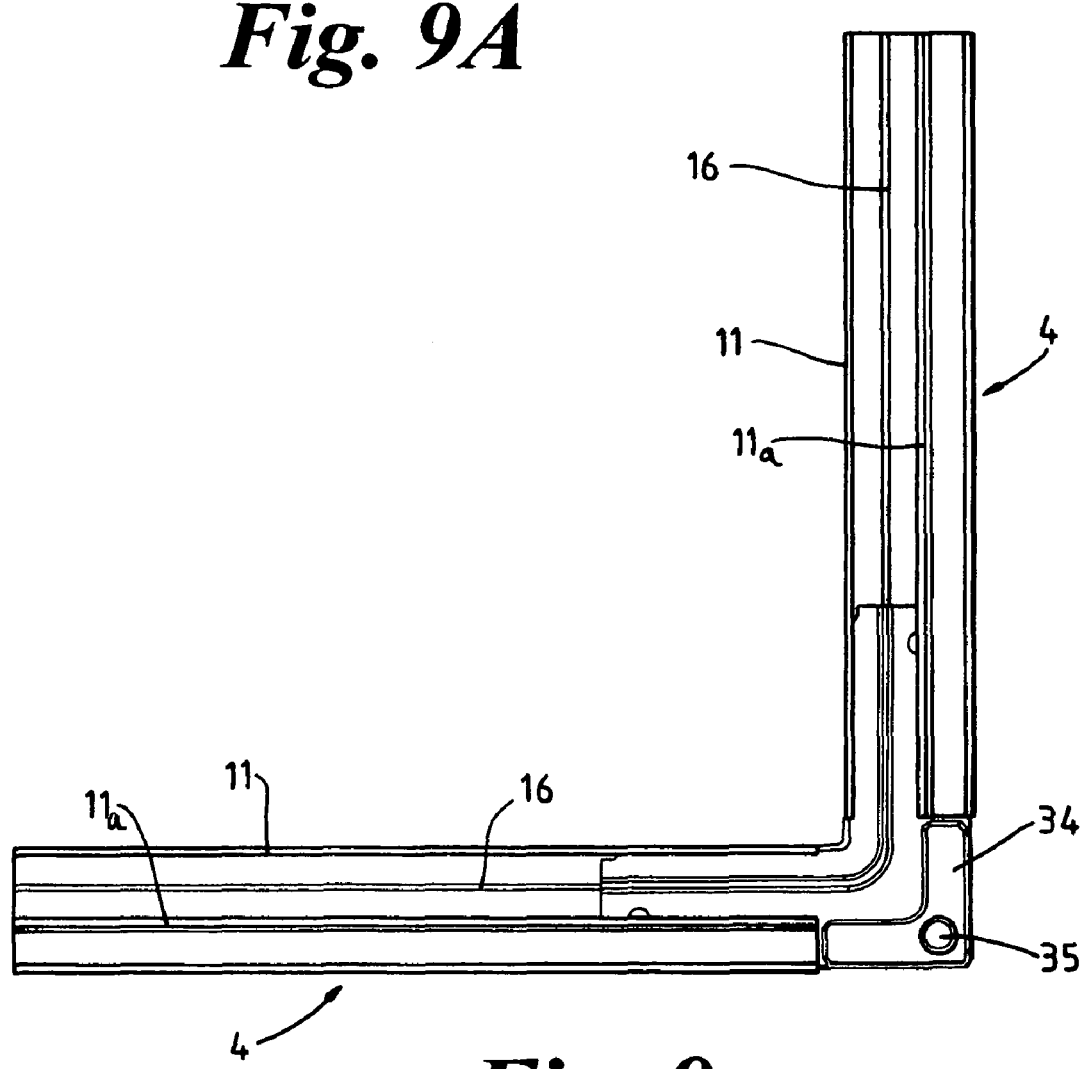
FIG. 9 is a front view of the assembly illustrated in FIG. 8.

The assembly shown in FIG. 6 prior to insertion of the duct 1 is illustrated in FIG. 9a.

FIGS. 2 and 3 illustrate the connection of one duct section 1 to another duct section 2. When installing the duct sections 1, 2, the installer takes four right angle plates 5 and inserts the ends of each plate 5 into a flange 4. The four flanges of the rectangular assembly are then pressed onto the insulation board of the duct section 1. This procedure is repeated in to attach flanges 4 to duct section 2.

Figure 10:
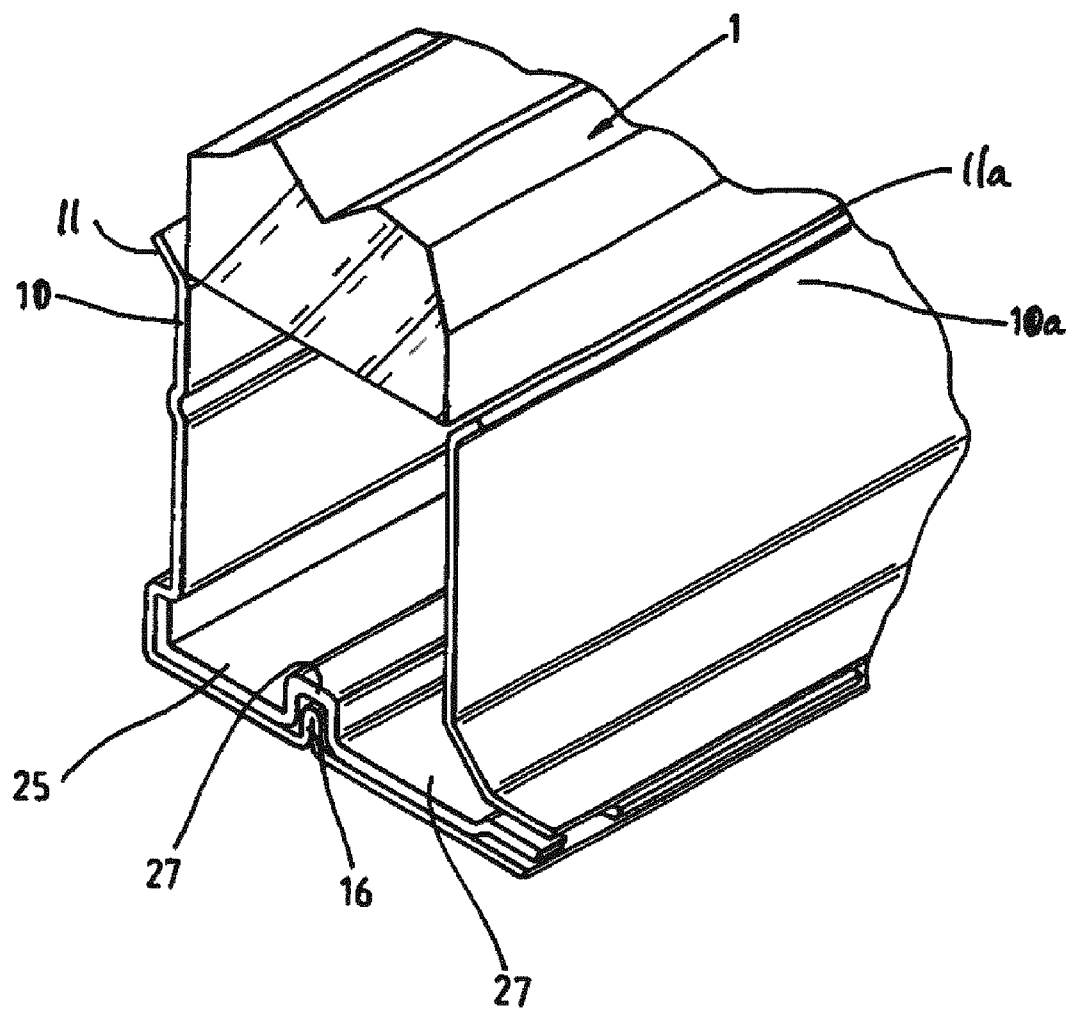
FIG. 10 illustrates an insulated board of the type used to construct insulated duct being inserted into the flange of the connecting apparatus.
Figure 11:
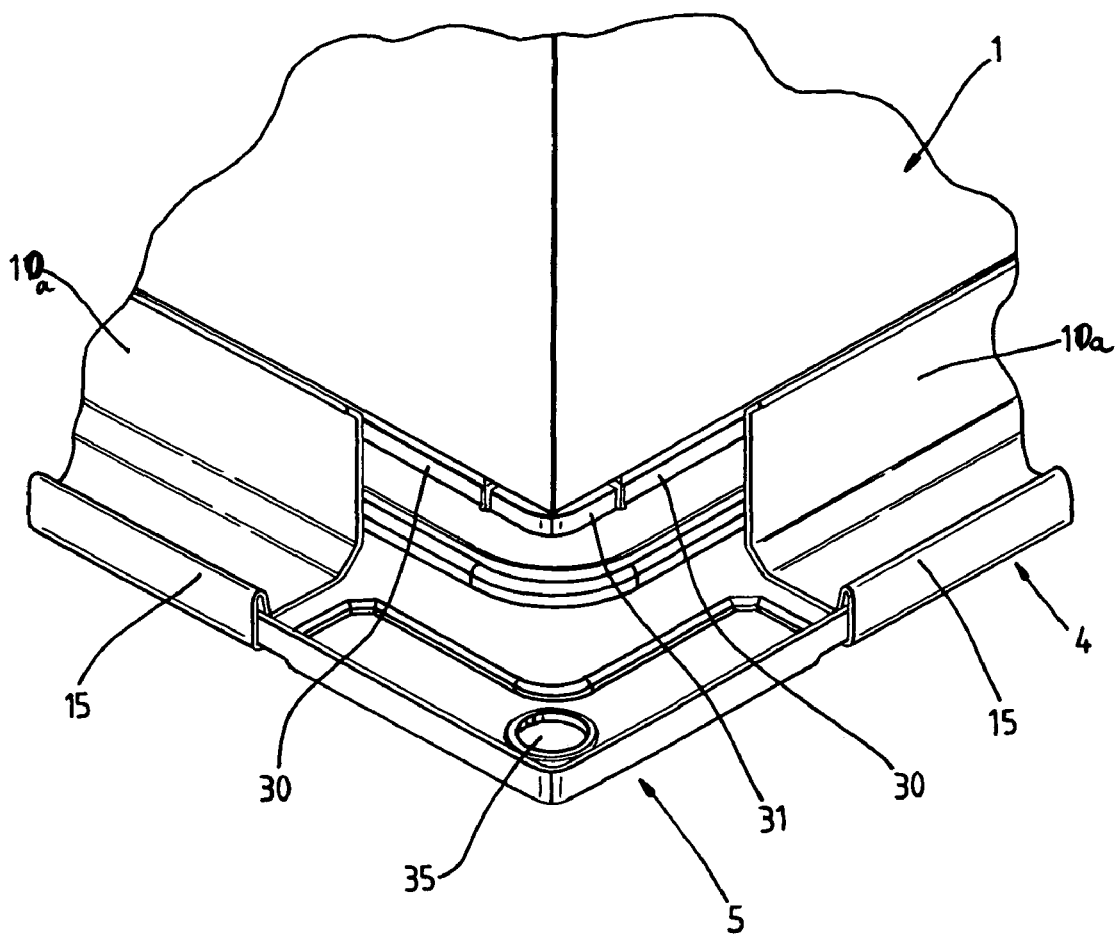
FIG. 11 is a schematic representation of the connecting apparatus connected to insulated duct.
Figure 12:
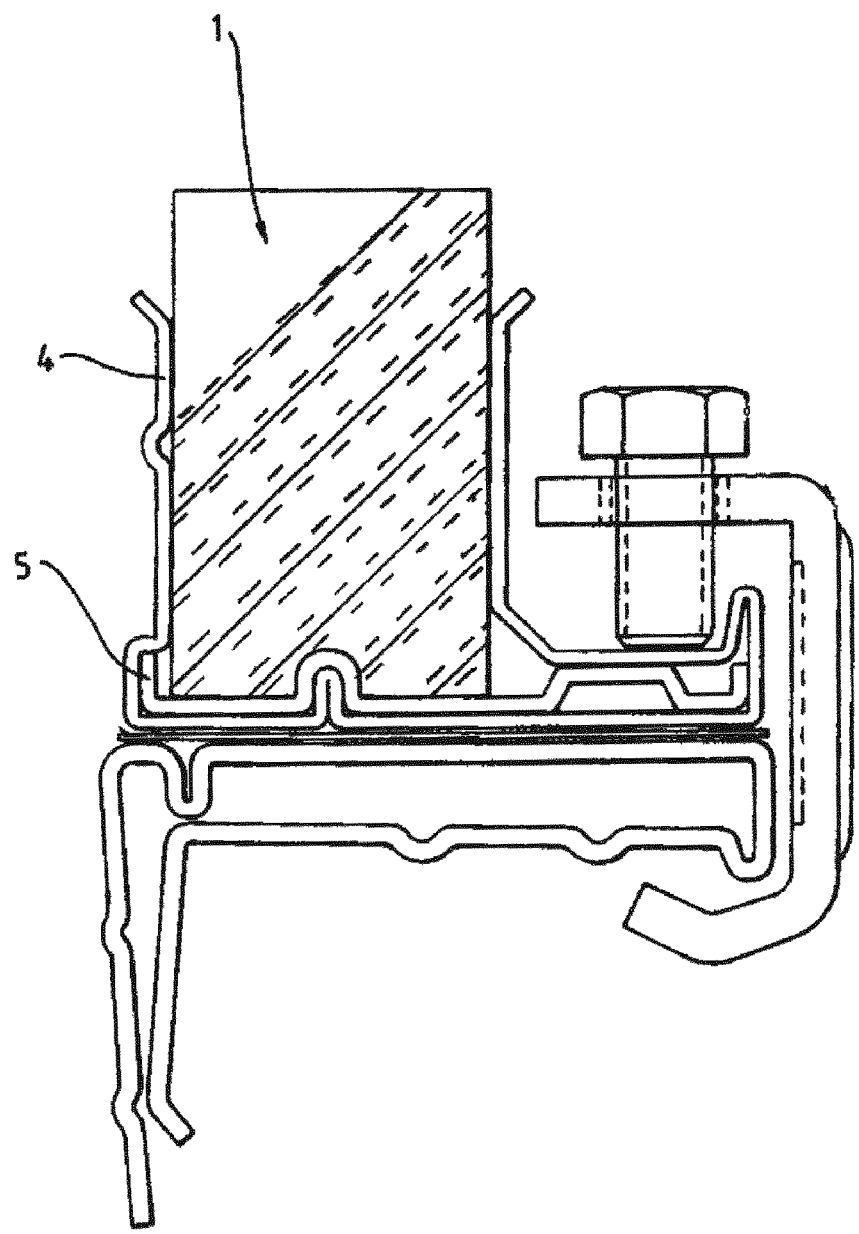
FIG. 12 illustrates an insulated duct section provided with connecting apparatus of the invention to an un-insulated duct section.

FIGS. 10 and 11 illustrate the insertion of a duct section 1 into a flanges 4 connected by a right angled plate 5.

The walls 10 of the flange 4 may be crimped to enhance the attachment of the flange 4 to the duct section. By crimping the walls 10, engagement of the flange 4 with the duct section 1 is more positive than relying on the resilience of the steel from which the flange is made to hold the duct section 1 in the flanges 4.

The right angled nature of the corner element illustrated in the Figures provides for the attachment of rectangular duct sections. Other shapes of duct sections could be accommodated by changing the angle of the corner element. For example a hexagonal duct could be provided for with a corner element in which the angle X is 60 degrees.

In this specification the term duct section is used. A duct section may be, but is not limited to, a duct section such as duct sections 1 or 2, and may include a duct termination member, or a bend for example.

Using the invention, connection of one insulated duct section to another is simple. The corner elements are pushed into the flanges. The flanges are presented up to an end face of a duct section and pressed on. Adjacent duct sections equipped with the connector assembly of the invention are then fixed together using simple fasteners, such as nuts and bolts. Not only is connection to other insulated duct sections simple, but so is connection to other duct sections, such as un-insulated duct sections. Un-insulated ducts sections are typically attached to one another by fasteners passing through apertures in brackets projecting from the corners of the end faces of the ducts. Hence, the connecting assembly of the invention allows an insulated duct section to be connected to an un-insulated duct section. The ability to attach an insulated duct section to an un-insulated duct section is particularly advantageous where an environment only requires insulated duct section in certain areas.

What I claim is:

1. A connector assembly configured to connect an insulated duct section having walls formed of insulated board to another duct section, the assembly comprising a plurality of first elements, and a plurality of second elements, wherein each first element includes attachment means for attachment of an end face of a duct section thereto, and wherein, in use, at least one second element engages with two first elements, wherein each first element comprises a flange, and each attachment means comprises an opening in the flange configured to receive a wall of the insulated duct section, wherein each second element constitutes a corner element, wherein each said first element and each said second element each include a sealing means, and wherein the sealing means of the said first elements comprises a rib extending along a longitudinal axis of each first element and the sealing means of each second element comprises a complementary channel extending between the free ends thereof, wherein, in use, the rib of the first elements being received in the channel of the corner elements, and wherein the sealing means of the first and second elements each extend into and seal in a groove in an end face of the insulated duct section providing a substantially continuous seal between the first and second elements and the end face of the insulated duct section.

2. A connector assembly according to claim 1, wherein each second element engages with two first elements.

3. A connector assembly according to claim 1, wherein each first element includes a second element receiving means.

4. A connector assembly according to claim 3, wherein the receiving means comprises an opening so shaped and dimensioned as to receive a part of a second element.

5. A connector assembly according to claim 4, wherein the said part of the second element is a push fit in the opening.

6. A connector assembly according to claim 1, wherein each first element is formed in pressed steel.

7. A connector assembly according to claim 1, wherein the said steel is spring steel.

8. A connector assembly according to claim 1, wherein each first element includes at least one reinforcement element.

9. A connector assembly according to claim 1, wherein the shape of each corner element constitutes a right angle.

10. A connector assembly according to claim 1, wherein each corner element comprises an outer corner and an inner corner, and wherein a raised portion is located at the inner corner.

11. A connector assembly according to claim 10, wherein, in use, ends of first elements engage with the raised portions of the corner elements.

12. A connector assembly according to claim 1, further comprising fixing means for fixing one insulated duct section provided with a connector assembly according to claim 1 to another duct section provided with a connector assembly.

13. A connector assembly according to claim 12, wherein the another duct section is an insulated duct section and is provided with a connector assembly according to claim 1.

14. A connector assembly according to claim 12, wherein each second element includes part of the fixing means.

15. A connector assembly according to claim 12, wherein the fixing means includes an aperture in each corner element and a fastener passing through two aligned apertures.

16. An assembled duct comprising an insulated duct section having walls formed of insulated board and another duct section, wherein the insulated duct section is provided with a connector assembly connecting the insulated duct section to the other duct section, the assembly comprising a plurality of first elements, and a plurality of second elements, wherein each first element includes attachment means for attachment of an end face of a duct section thereto, and wherein at least one second element engages with two first elements, wherein each first element comprises a flange, and each attachment means comprises an opening in the flange, a wall of the insulated duct section being received in said opening, wherein each second element constitutes a corner element, wherein each said first element and each said second element each include a sealing means, and wherein the sealing means of each said first element comprises a rib extending along a longitudinal axis of the first element and the sealing means of each second element comprises a complementary channel extending between the free ends thereof, the rib of the first elements being received in the channel of the corner elements, and wherein the sealing means of the first and second elements each extend into and seal in a groove in an end face of the insulated board of the insulated duct section received in the said opening, providing a substantially continuous seal between the first and second elements and the end face of the insulated duct section.

* * * * *